INVENTOR
VINCENT P. MILLER

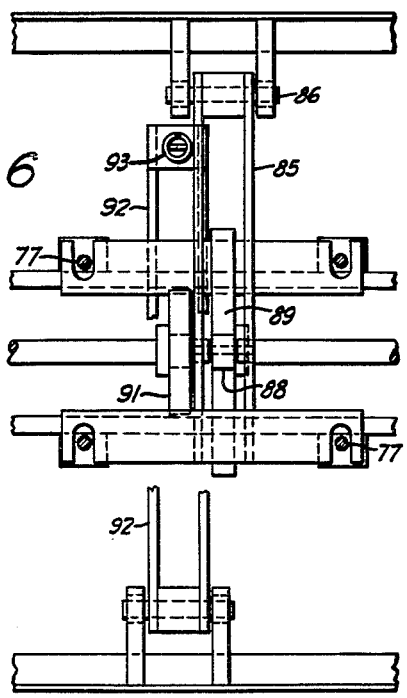
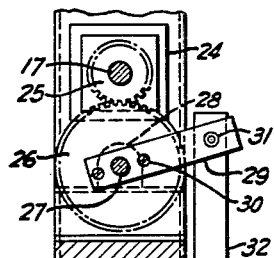
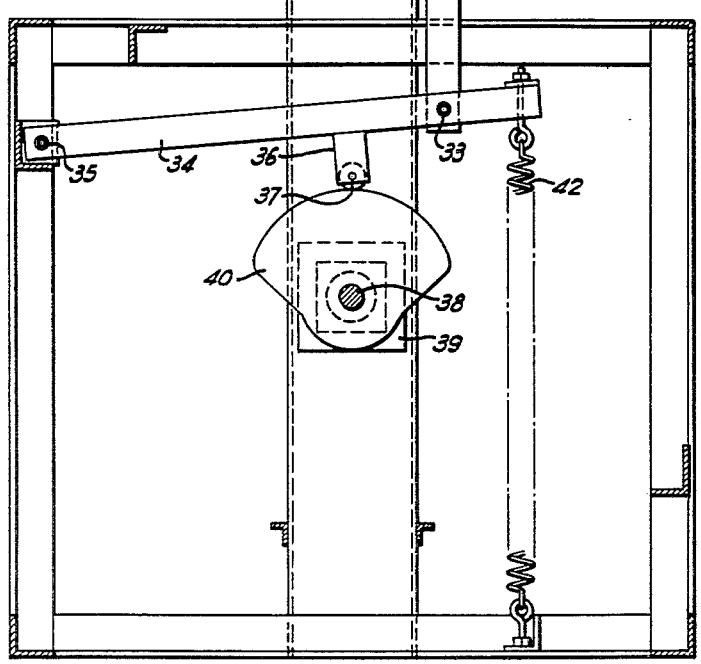

May 31, 1960 V. P. MILLER 2,938,636
AUTOMATIC TRANSFER FOR USE IN MAKING POTTERY WARE
Filed July 14, 1958 8 Sheets-Sheet 4

INVENTOR.
VINCENT P. MILLER
BY
Brown, Critchlow, Flick & Peckham
ATTORNEYS

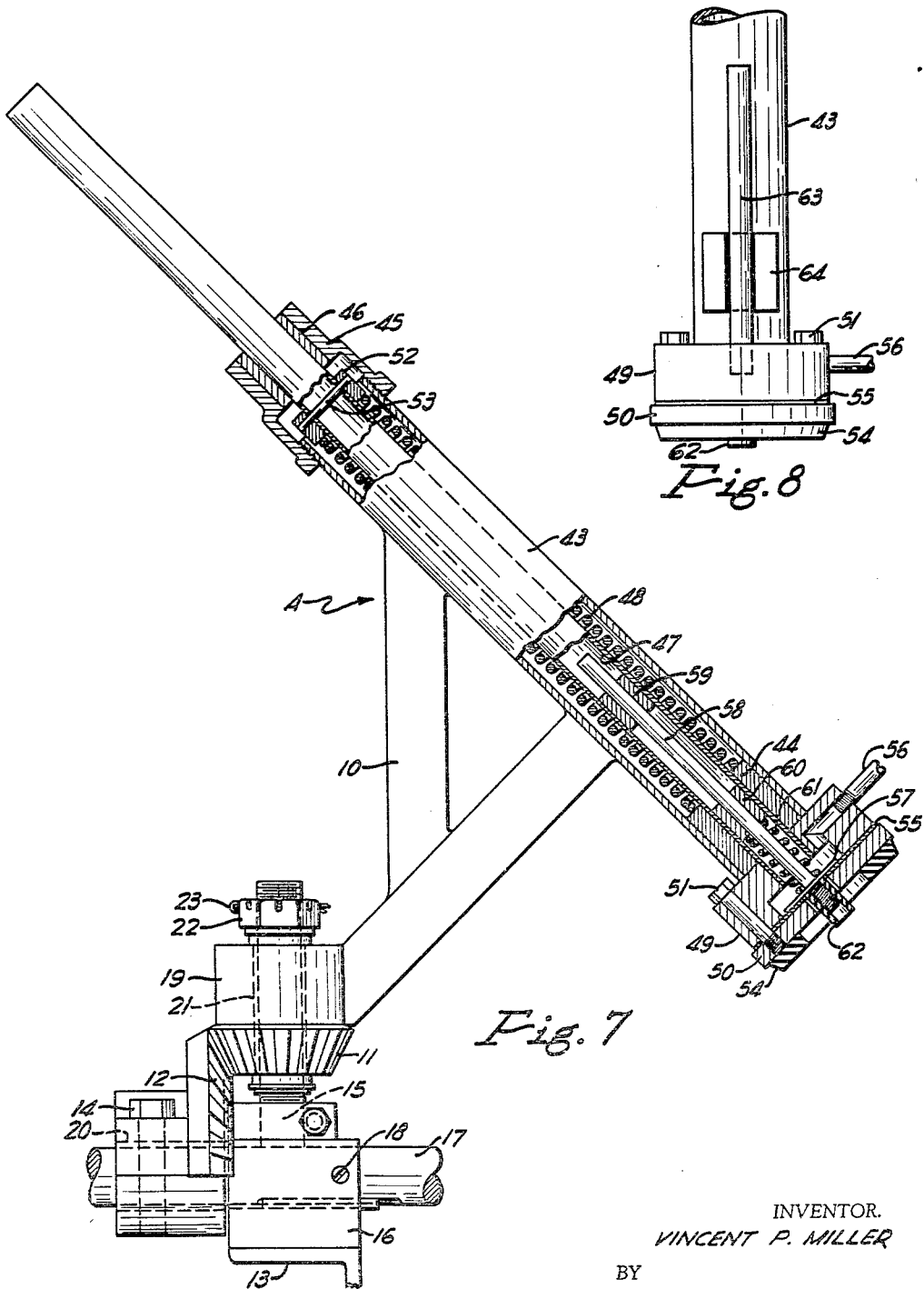

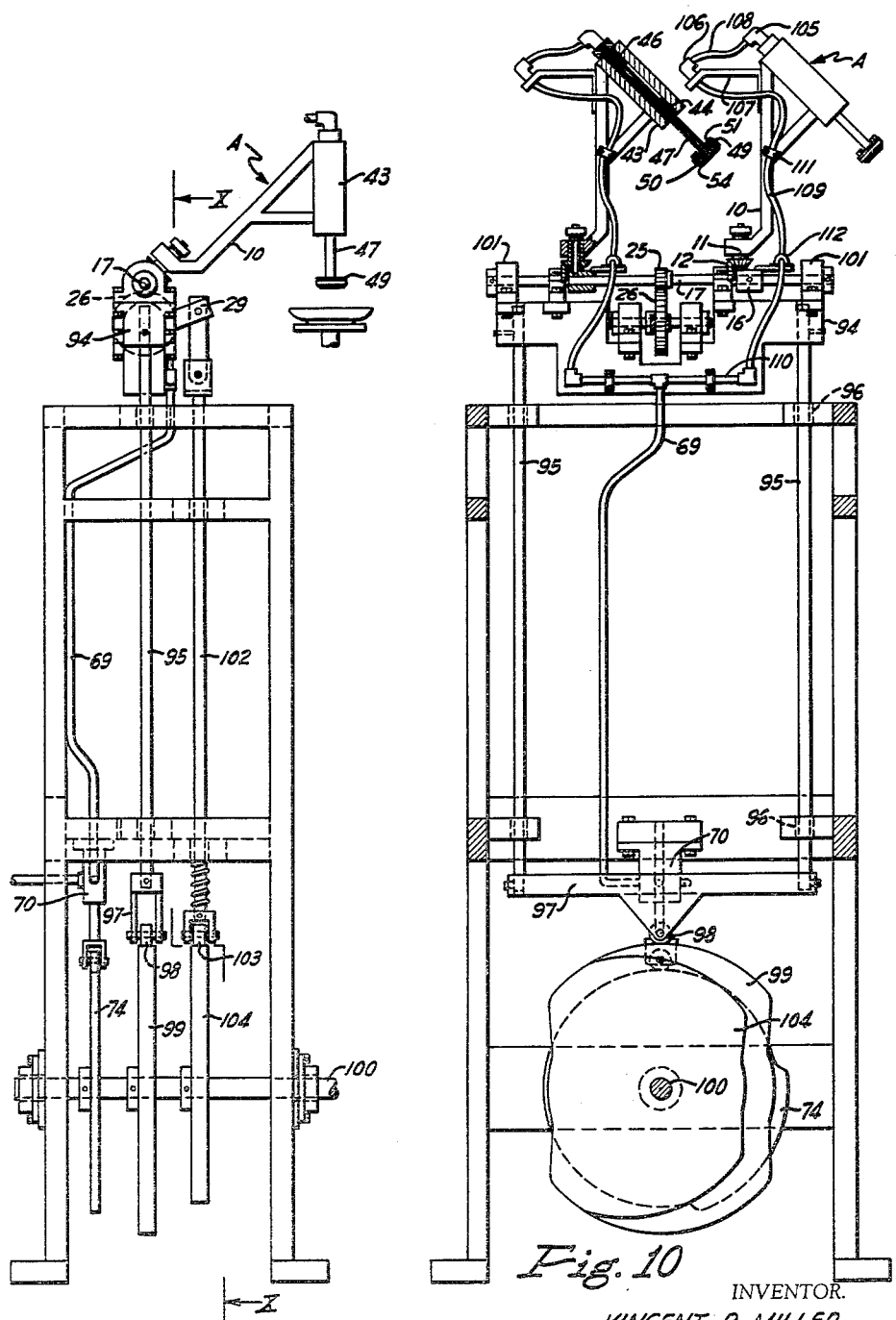

May 31, 1960   V. P. MILLER   2,938,636
AUTOMATIC TRANSFER FOR USE IN MAKING POTTERY WARE
Filed July 14, 1958   8 Sheets-Sheet 7

INVENTOR.
Vincent P. Miller
BY
Brown, Critchlow, Flick & Peckham
ATTORNEY

United States Patent Office 2,938,636
Patented May 31, 1960

2,938,636
AUTOMATIC TRANSFER FOR USE IN MAKING POTTERY WARE

Vincent P. Miller, Pittsburgh, Pa., assignor to Miller Pottery Engineering Company, Pittsburgh, Pa., a corporation of Pennsylvania Filed July 14, 1958, Ser. No. 748,391

11 Claims. (Cl. 214—1)

This invention relates to a device adapted to transfer individual pieces of dinnerware from one place to another.

Ceramic dinnerware is made by a method involving a succession of separate operations on each piece, and no single machine yet developed is able to complete all of these operations. Individual machines have been developed which are capable of carrying out certain of these operations, but it is necessary to carry or transfer a piece from one machine to the other.

The present invention provides an automatic transfer capable of picking up a piece of dinnerware, either from a particular machine, or from a conveyor, and depositing it on the starting platform of another machine, or on another conveyor.

A particular object of the invention is to provide a ware transfer means having sufficient latitude to permit the transfer of pieces of different diameters or heights, without need for adjusting the transfer mechanism.

Another object is to provide a transfer able to unstack or to restack pieces without need to adjust the transfer mechanism.

Another object is to provide a transfer requiring a minimum of space but being able to transfer the ware in the shortest practical route, thereby permitting maximum speed of production.

In many cases the ware is carried by a particular machine in a certain position, i.e., right side up, and the transfer of the present invention deposits the ware in this same position in the new location. In the operation of the automatic transfer a transfer head lifts a piece of ware by suction, and the head is then moved by a semi-planetary motion from the pick-up position to the delivery position without inverting the piece of ware.

The transfer of this invention may be used to transfer ware directly from molds onto machine chucks; from machine chucks onto conveyors; or it may be used to unstack and restack the ware in a new location.

The transfer heads are carried by arms moved about a shaft, and any desired number of transfer heads may be mounted on a particular automatic transfer.

These, and other objects and advantages of the invention will become apparent as the description proceeds.

In the drawings,

Fig. 3 is a section on line III—III of Fig. 1.

Fig. 6 is a section on line VI—VI of Fig. 1.

Fig. 7 is a section through the transfer arm.

Fig. 8 is an elevation of a detail of the transfer arm.

Fig. 9 is an end elevation of a transfer machine embodying a modified form of the invention.

Fig. 10 is a cross-section on line X—X of Fig. 9, but showing the transfer arms in a different position.

The invention will first be described in connection with the embodiment of Figs. 1 to 8 inclusive.

Semi-planetary motion of transfer head

Figure 2:
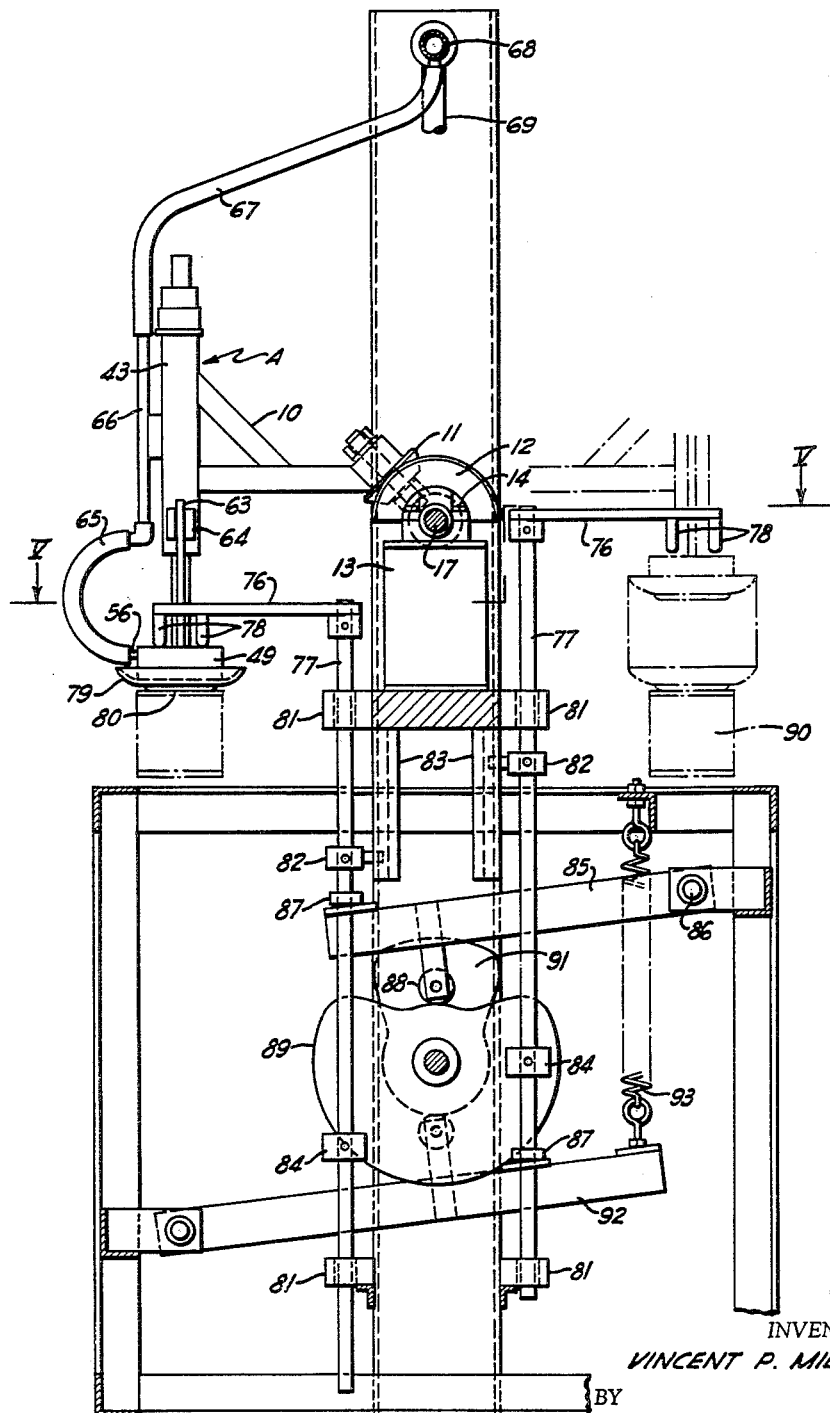
Fig. 2 is a section on line II—II of Fig. 1, but showing the transfer arms in a different position.

An important feature of the invention resides in the fact that the transfer head, indicated generally by the letter A, is moved by a semi-planetary motion from the pick-up station, shown at the left side of Fig. 2, to the delivery station, shown at the right side of Fig. 2.

The transfer head is mounted on a transfer arm 10 and movement of the transfer arm from the pick-up to the delivery stations is caused by interengaging bevel gears 11 and 12. The bevel gear 12 is semi-circular in shape corresponding to the upper half of a gear, and is stationarily mounted on a frame pedestal 13 by means of bolts 14.

The bevel gear 11, which intermeshes with gear 12, is rotatably mounted on a stud shaft 15 projecting from a collar 16 which is keyed to a shaft 17 by a set screw 18. The bevel gear 11 carries a collar 19 and the transfer arm 10 is attached to the collar 19 by welding or some other secure connection.

It will be clear from the above description that when shaft 17 is rotated, the rotating bevel gear 11 will be caused to traverse across the face of the stationary gear segment 12, thereby rotating bevel gear 11 and causing the transfer arm to rotate and to move from the pick-up station to the left of Fig. 2 to the delivery station at the right of Fig. 2 in a semi-planetary motion. That is, the arc of travel of the arm will be not only upwardly from left to right, as viewed in Fig. 2, but it will dip backwardly away from the plane of the paper as viewed in Fig. 2, and will rotate during this motion. The transfer arm is illustrated midway of its arc of travel in Fig. 1.

In order to provide proper bearing supports for the moving parts just described, a shaft bushing 20 is secured between the segmental gear 12 and the frame pedestal 13. Similarly, a bushing 21 is mounted within the collar 19 to provide a bearing surface for the transfer arm 10.

The collar 19 which carries transfer arm 10 is held in place on the stud shaft 15 by retaining collar 22 and pin 23. The shaft 17 extends across the full width of the machine and its opposite ends are supported in bearing blocks 24 mounted on the frame.

Rotating movement of shaft 17 is caused by a small pinion gear 25 keyed to shaft 17 and which engages a larger drive gear 26. The drive gear is rotatably mounted on a stud shaft 27 which is mounted in bearing blocks 28 mounted on the machine frame.

As shown in Fig. 3, partial rotation of the drive gear 26 is provided for by arms 29 secured to opposite sides of the drive gear 26 by means of screws 30. The outer ends of the arms 29 are pivotally connected at 31 to a vertical link 32, the lower end of which is pivotally connected at 33 with a lever arm 34. The outer end of the lever arm is pivoted to the frame at 35.

Adjacent to the pivot point 33 the lever arm 34 has downwardly projecting extensions 36 which carry a cam roller 37. A cam shaft 38 extends across the machine parallel to the shaft 17 and has its opposite ends mounted in bearing blocks 39 mounted on the machine frame. A cam 40 is mounted on the shaft 38 so as to engage the cam roller 37.

The operating parts just described are so arranged that as the cam shaft 38 is rotated from any suitable source of power through drive sprocket 41, the extended lobe of cam 40 pushes upward on cam roller 37 thus moving upward the outer end of lever arm 34 which pushes upwardly on vertical link 32 and causes corresponding motion of arms 29 and drive gear 26, thus rotating shaft 17. The parts are so proportioned that upward motion of the vertical link 32 causes shaft 17 to rotate through an arc of 90°, which in turn causes the transfer arm 10 to traverse a full 180° arc from the pick-up station to the delivery station.

In the specific embodiment illustrated the bevel gears 11 and 12 are shown in 2:1 ratio, thereby requiring only 90° rotation of shaft 17. It will, of course, be understood that gears of different ratios may be substituted provided appropriate compensatory changes are made in other related parts.

Figure 1:
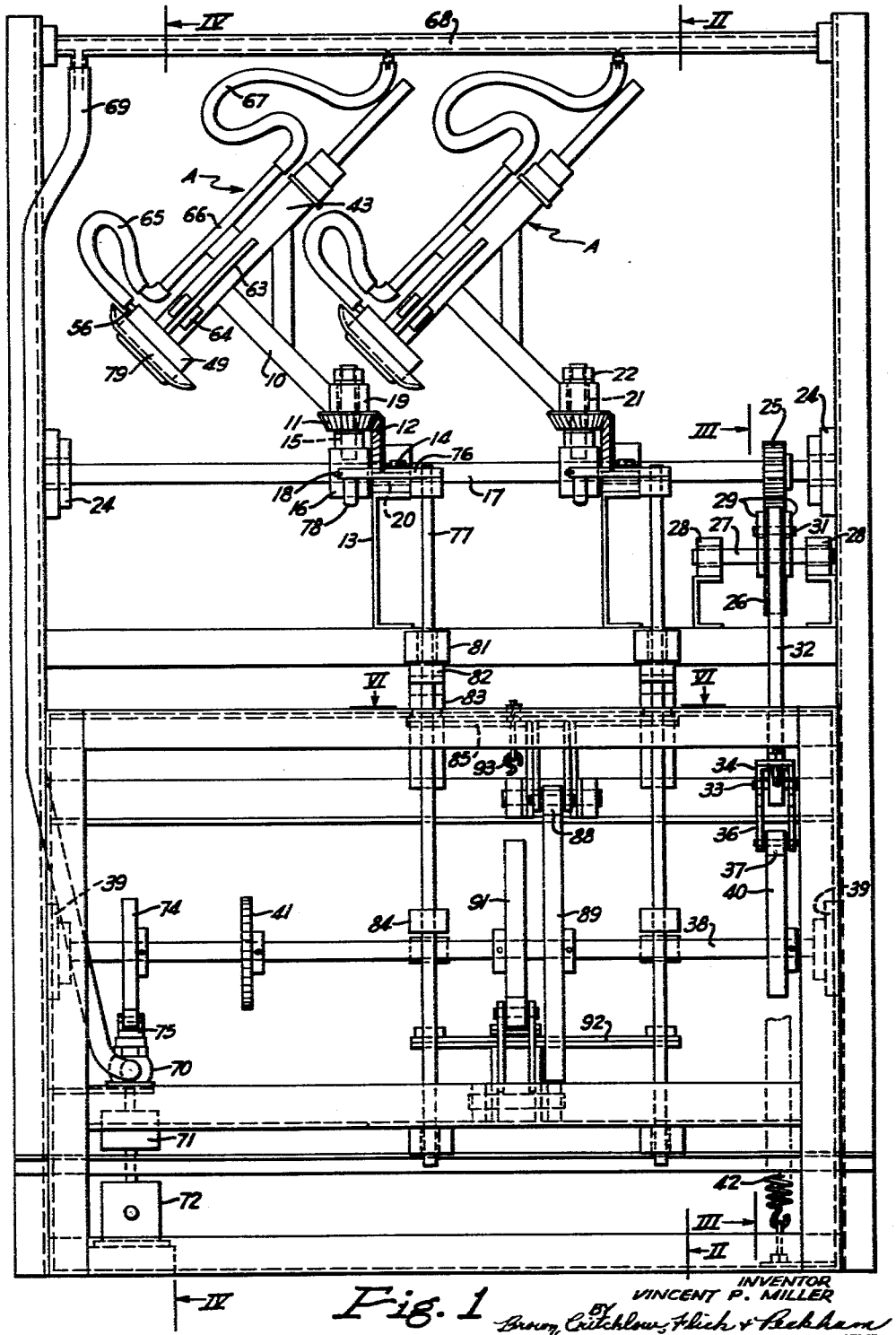
Fig. 1 is an elevation of a machine embodying one species of the invention.

As shown in Fig. 1 more than one transfer arm 10 may be mounted on the shaft 17 and the weight of these arms as they move toward their delivery station will have a tendency to rotate shaft 17 and thus lift the lever arm 34 so that the cam roller 37 is lifted away from the cam 40. In order to prevent such an occurrence the free end of lever arm 34 is biased downwardly by a suitable weight or by the spring 42 illustrated in Fig. 3.

*Transfer head*

The detail construction of the transfer head is shown in Figs. 7 and 8. This construction includes an outer support tube 43 which is welded or otherwise suitably secured to the branches of the transfer arm 10. A bearing bushing 44 is pressed in the lower end of support tube 43 and a cap 45 carrying a bearing bushing 46 has a threaded connection with the upper end of tube 43. The inner diameters of bushings 44 and 46 are identical, and a tubular plunger 47 is slidably mounted in these bushings.

A cup-shaped member 49 is secured to the lower end of tubular plunger 47, and a steel disc 50 is secured to member 49 by means of bolts 51. A spring 48 holds the suction cup in retracted position.

Collar 52 fits around the tubular plunger 47 and within the upper end of the upper support tube 43. This collar 52 is keyed to the tubular plunger 47 by means of pin 53.

A circular disc 54 of resilient material such as rubber, is cemented to the outer face of the steel disc 50. A gasket 55 of suitable material is interposed between the steel disc 50 and the cup-shaped body 49. A vacuum connection 56 connects with the interior of the cup-shaped body 49 so as to produce a vacuum within the suction cup.

Whenever a multiplicity of these transfer heads is used in a single machine, it is preferable to provide a vacuum control valve in each head. In the form illustrated the vacuum control valve includes a valve disc 57 which engages the inner surface of gasket 55. The valve disc 57 is mounted on a valve stem 58 which slides in bushings 59 and 60 mounted within the tubular plunger 47. An expansion spring 61 has its upper end pressing against the bushing 60 and its lower end pressing against the valve disc 57 to normally close the opening in the gasket 50. The lower end of valve stem 58 projects downwardly past the valve disc 57 and a rubber nipple 62 is attached to the lower end of the valve stem 58 and projects below the lower surface of the rubber disc 54.

In the operation of this transfer head, a vacuum is normally maintained within the suction cup by means of the vacuum connection 56. When the suction cup is moved downwardly into contact with a piece of ware, the rubber nipple 62 first contacts the ware thus opening the valve 57, so that as the rubber disc 54 engages the ware a suction is created which holds the ware to the suction cup until the vacuum is subsequently broken.

When a piece of ware is to be deposited from the pick-up arm, the vacuum connection is disconnected and atmospheric air is allowed to enter the suction cup. When this is done the piece of ware tends to fall by its own weight and its disengagement from the pick-up head may be assisted by the force of spring 61 pressing the valve stem 58 downwardly against the piece of ware.

In certain installations it may be desirable for several reasons to prevent the transfer cup 49 from turning in the support tube 43. This may be done by providing a guide rod 63 (see Figs. 2 and 8) which has its lower end screwed into the cup-shaped body 49 and slides within a guide 64 which is suitably attached to the outside of the support tube 43.

Figure 4:
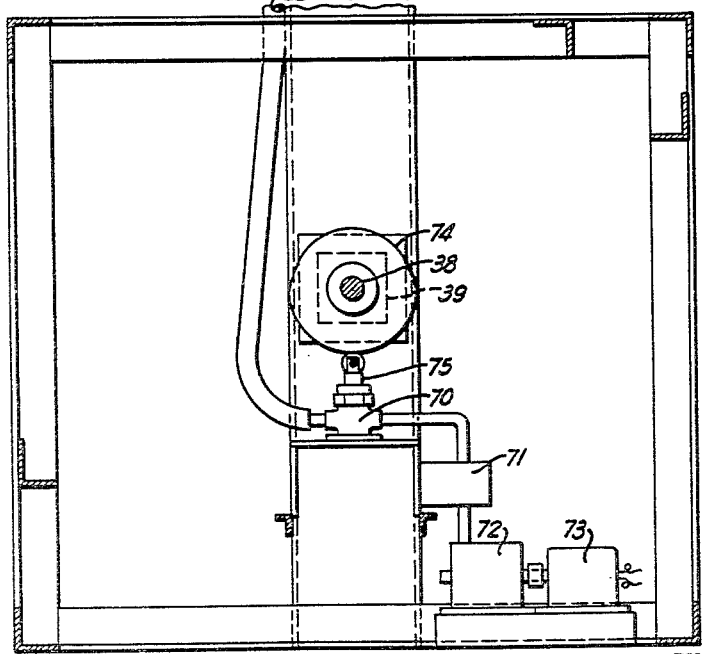
Fig. 4 is a section on line IV—IV of Fig. 1.

The vacuum system which creates a vacuum within the cup-shaped body 49 is shown in Figs. 1 and 4. This system includes a rubber hose 65 one end of which is attached to the fitting 56 on the cup-shaped body 49 and the other end of which is attached to a piece of pipe 66 which is stationarily attached to the outer support tube 43. The hose section 65 is of such a length as to provide an outstanding loop so as to permit reciprocation of the cup-shaped body 49 relative to the main body of the pick-up arm. Another section of hose 67 is connected to the opposite end of the pipe 66 at one end and at the other end is connected to a header pipe 68 which extends across the machine frame. The hose 67 is long enough to provide a relatively large loop that will permit free movement of the transfer head in its semi-planetary motion.

Vacuum is supplied to the header pipe 68 by means of a pipe 69 which extends downwardly along one side of the frame and is connected to vacuum valve 70. The vacuum valve is connected through a reserve tank 71 to a vacuum pump 72 which is operated by motor 73.

A cam 74 keyed to cam shaft 38 presses downwardly on the valve stem 75 to connect the vacuum system to the cup-shaped body 49 at the proper time in the sequence of operations. When stem 75 is released atmospheric air enters the lines by means provided in valves of this type.

*Final positioning of transfer head*

When the transfer head arrives at a pick-up station, it is spaced a considerable distance above the dish to be picked up, thus allowing it to contact the top dish of a stack. Means is therefore provided to press the transfer head down upon the dish, regardless of the height of the stack. This final positioning means is a yoke arm which provides a firm yet gentle control of the final positioning and return movement of the transfer head.

It has previously been explained that the transfer head swings in a semi-planetary motion from the pick-up station, shown at the left of Fig. 2, to the delivery station, shown at the right of Fig. 2. The final positioning mechanism includes a yoke arm 76 which is carried at the upper end of a vertically slidable push rod 77. The outer end of the yoke arm 76 is provided with a pair of parallel fingers 78 which form a yoke. The fingers 78 are spaced so that they can span the outer tube 43 of the transfer head and at the same time engage the upper surface of the transfer cup 49.

Figure 5:
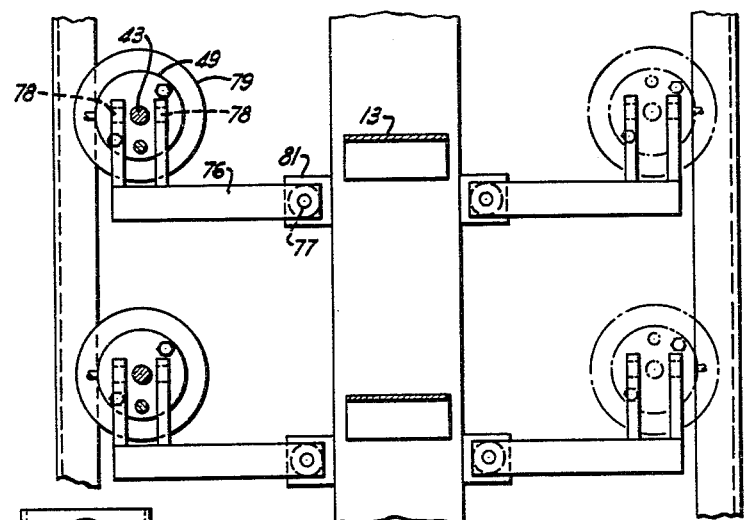
Fig. 5 is a section on line V—V of Fig. 2.

The yoke is so positioned that when the transfer head moves back from the delivery station to the pick-up station shown at the left of Fig. 2, the suction cup will be positioned directly below the fingers 78 of the yoke, as illustrated in Figs. 2 and 5. The push rod 77 will now be caused to move downwardly with the result that the fingers 78 press downwardly on the transfer cup 49 and press the transfer head into engagement with the dish 79, which is shown as standing on the upper level 80 of a conveyor belt.

A vacuum is now present within head 49 to cause the dish 79 to adhere to the transfer cup 49. After this action has taken place the yoke will be raised so as to permit the transfer cup to pass out from under the yoke and move to the delivery station.

When the transfer head is in the delivery station at the right side of Fig. 2, a similar yoke arm 76 presses the suction cup down until the dish rests on the conveyor, or on top of a stack of dishes. The vacuum valve is controlled so as to break the vacuum after the dish has been so deposited. Thereupon, the yoke 76 eases the upward movement of the suction cup.

The mechanism for controlling the up and down movements of the yoke will now be described. It will be clear from Figs. 1 and 2 that the push rod 77 is normally biased downwardly by its own weight or by a supplemental weight 84. Upward movement of push rod 77 is caused by a lever 85 hinged to the frame at 86 and having its outer end adapted to engage a stop collar 87 secured to the push rod 77. The push rod 77 is supported in bushings 81 and its vertical movement is guided by a guide finger 82 moving in a guide groove 83.

To move the lever 85 upwardly a cam roller 88 depends from the lever 85 and engages cam 89 mounted on cam shaft 38. The contour of cam 89 is arranged so as to push the push rod 77 upward as desired during the sequence of operations of the machine. This cam contour is designed so as to permit the push rod 77 to move down very gently and gradually to provide the above-described contact of the transfer cup 49 with the dish 79. Since the push rod 77 is positively pushed upward by the cam but is moved downward by gravity, the position of the transfer cup 49 is automatically adjusted to the height at which the dish 79 is located such, for example, as when it is the top dish in a stack of dishes.

A similar yoke arm 76 with similar operating mechanism may be provided to push the transfer cup downwardly at the discharge station shown at the right of Fig. 2 in order to deposit the dish. Fig. 2 illustrates the dish 79 being deposited on the top of a stack of dishes on a conveyor 90.

In the case of the yoke arm 76 illustrated at the right side of Fig. 2, the lever 92 is positively moved downward by cam 91, thus permitting the push rod 77 to be moved downward by gravity. The lever 92 is biased upwardly by spring 93.

Since the combined weight of the yoke arm 76 and push rod 77 is greater than the force of spring 48 which biases the suction cup to its retracted position, the contour of cam 91 controls the upward travel of the suction cup.

The above description has been limited to a single transfer head and its associated mechanism. It will be clear, however, from Fig. 1 that the machine illustrated is equipped with two identical transfer heads with related mechanism, and it will be understood that any suitable number of these transfer heads may be provided in a single transfer machine.

*Modification with reciprocating crosshead*

Figs. 9 and 10 inclusive illustrate a modification which is particularly adapted for transferring dinnerware which is especially fragile, such as unfired dinnerware. In this modification the transfer mechanism is mounted on a crosshead which is reciprocated vertically in the frame of the machine. This vertical movement of the transfer mechanism permits the suction cups to be lowered gently into contact with the ware.

As shown in these figures, the crosshead 94 is carried by vertical rods 95 which slide in guide bushings 96 mounted on the frame and supported from cross piece 97. A cam roller 98 depends from the cross piece 97 and engages a cam 99 which is keyed to cam shaft 100.

The shaft 17 which carries the transfer arm is rotatably mounted in bearings 101 carried by the crosshead 94 and the transfer arm 10 is mounted on a movable bevel gear 11 which cooperates with a stationary segmental gear 12 as previously described.

The shaft 17 is rocked by a small gear 25 which engages a larger drive gear 26 as explained previously, but in this case the arms 29 which rotate the drive gear 26 are moved by means of a vertical push rod 102 which carries at its lower end a cam roller 103 which engages a cam 104 mounted on cam shaft 100.

In the present modification there is also a change in the construction of the transfer head. In this case the tubular plunger 47 is freely slidable in bushings 44 and 46 mounted in the outer support tube 43. The lower end of tubular plunger 47 is provided with a flange 49 to which is secured a steel disc 50 by means of bolts 51. A disc 54 of resilient material such as rubber is cemented to the disc 50.

An elbow fitting 105 is attached to the upper end of the tubular plunger 47 for connection with the vacuum line. An elbow fitting 106 is mounted on a bracket 107 attached to the transfer arm 10 and a section of rubber hose 108 connects elbow fittings 105 and 106. The length of hose 108 has sufficient slack to permit free reciprocation of plunger 47 in support tube 43.

Another piece of hose 109 extends from elbow 106 to a supply header 110 located within the crosshead 94. The hose 109 has sufficient slack to permit the semi-planetary movement of the transfer arm 10 and is supported from the transfer arm by clip 111 and from the collar 16 by clip 112. This arrangement permits free movement of the support arm in its semi-planetary travel without becoming entangled with hose 109.

The vacuum supply header 110 is connected by a line 69 to a vacuum valve 70 as previously explained.

The cams 99 and 104 have their contours so designed that the push rod 102 keeps step with the upward movement of the crosshead 94 and then when the crosshead 94 reaches the top of its vertical motion, push rod 102 continues its movement in order to rotate shaft 17 and cause the transfer heads to move from the pickup station to the discharge station as previously explained. Similar relative movement occurs during the downward movement of crosshead 94.

In this form of the machine, the vertical motion of the crosshead 94 is such that the suction cup moves downward gently to contact the piece of ware. As the crosshead continues its downward motion after the suction cup 48 has contacted the piece of ware, the tubular plunger 47 slides freely upwardly in support tube 43 without applying any additional pressure on the ware. In this way, the suction cups can compensate without any extra pressure for different positions of the ware such as might be occasioned in picking them up from a stack or depositing them on a stack.

*Modification with offset transfer arms*

Figure 11:
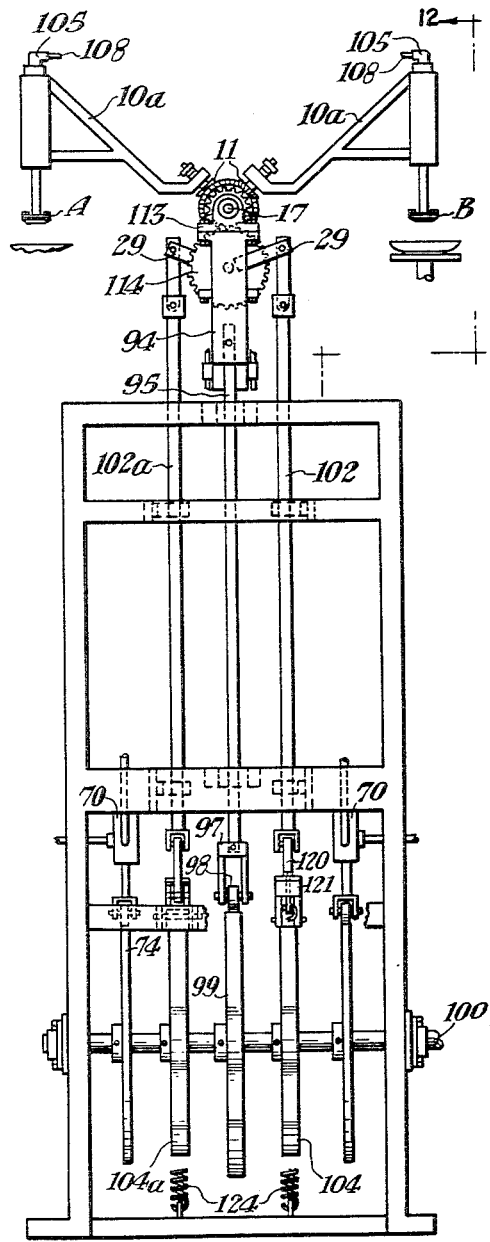
Fig. 11 is a view similar to Fig. 9 but showing a further modification.
Figure 12:
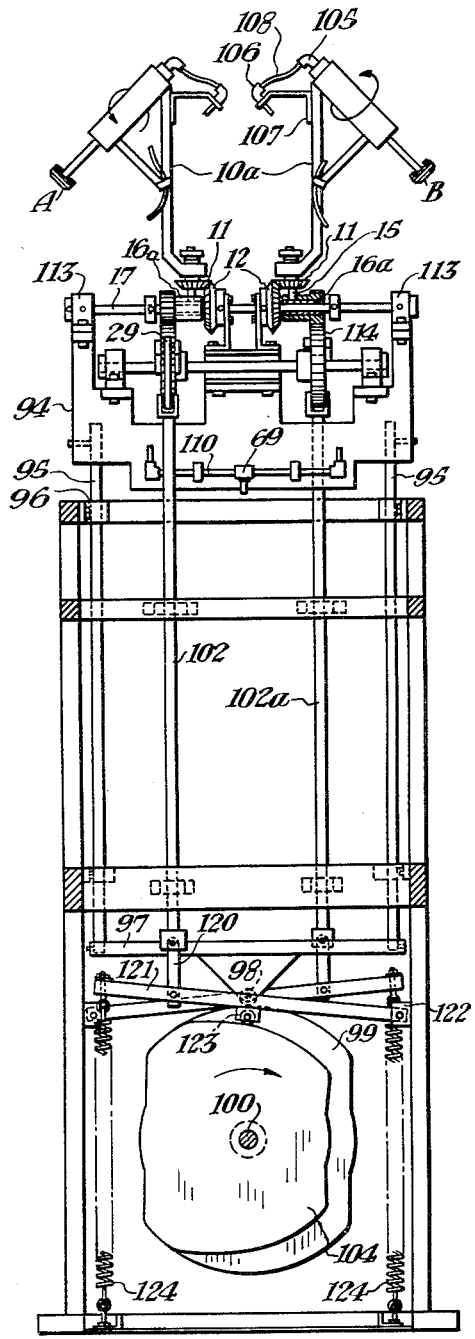
Fig. 12 is a cross-section on line X—X of Fig. 11, but showing the transfer arms in a different position.
Figure 13:
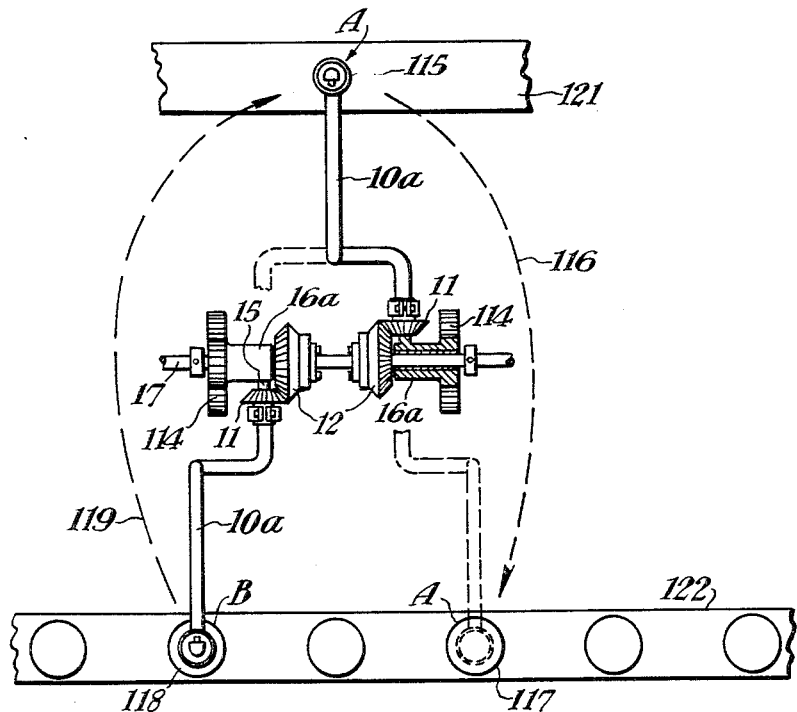
Fig. 13 is a diagrammatic view illustrating the operation of the device of Figs. 11 and 12.

A further modification of the invention is illustrated in Figs. 11, 12 and 13.

An important feature of this modification is the fact that the transfer arm is offset, as illustrated in Fig. 13. In other words, the end of the transfer arm which carries the suction cup is offset from the axis of the stud shaft which carries the transfer arm. This means that the transfer arm is able to serve two stations which are offset from each other. Further, it permits two transfer arms to be operated simultaneously in opposite directions, both serving the same station on one side of the apparatus, thus doubling the speed of service at that particular station.

In this embodiment the shaft 17 does not rotate, but is stationarily mounted in brackets 113. Each transfer arm 10a has its inner end positively attached to a bevel gear 11 as in the previous modifications. The bevel gear 11 in this case is rotatably mounted on a stud shaft 15 which is integrally mounted on a collar 16a, which in turn is rotatably mounted on the shaft 17. Collar 16a is rotated by means of a gear 114 integral with the outer end of the collar. When collar 16a is rotated, the bevel gear 11 is caused to traverse across the face of the stationary gear segment 12 in the manner previously explained.

This movement of bevel gear 11 causes the transfer arm 10a to be swung across the shaft 17 and simultaneously to be rotated. Preferably two of the transfer arms are mounted for cooperation, and the two collars 16a are rotated in opposite directions, causing the two transfer arms to travel simultaneously in opposite directions in the manner now to be described.

Considering first the transfer arm shown on the right in Fig. 13, it will be seen that the transfer head A is moved from the first station 115, along a path indicated generally by the broken line 116, to the second station 117.

The transfer arm shown at the left of Fig. 13 will simultaneously move transfer head B from the first station 118 along the path indicated generally by the broken line 119 to the station 115. The head B will arrive at station 115 at the same time head A arrives at station 117.

With this arrangement both transfer arms may be operating simultaneously, and thus the delivery of ware to a single receiving station may be expedited while keeping the movement of the transfer arms to a reasonable speed.

The use of the two oppositely moving transfer arms may be advantageous wherever it is advisable to transfer ware from two stations to a single station or vice versa. In Fig. 13 a conveyor belt 121 is shown on one side of the transfer, and a conveyor belt 122 on the other side for illustrative purposes only. The stations 115, 117 and 118 may represent any suitable stations in the course of dinnerware manufacture.

The conveyor belt at the bottom of Fig. 13 may be considered as an intermittently progressing mold carrier from which dried ware is to be transferred from the molds onto a machine at station 115 for performing further operations to the ware. In this case the mold carrier would intermittently advance one mold space during the travel of the transfer arms. In this way one transfer arm would pick up one alternate series of dishes, while the other transfer arm would pick up the other alternate series.

Figs. 11 and 12 illustrate a machine in which the oppositely moving transfer arms are mounted on a reciprocating crosshead 94 similar to the one shown in Figs. 9 and 10. In this case the crosshead is operated by mechanism similar to that shown in Figs. 9 and 10.

The pick-up heads A and B are also similar to those shown in Figs. 9 and 10.

Means for rotating the gears 114 in opposite directions is shown in the form of an arm 29 which is secured to each gear, the two arms 29 extending in opposite directions, as shown in Fig. 11.

To operate the arms 29 two identical cams 104 and 104A are identically positioned with respect to each other on the shaft 100, and operate slide rods 102 and 102A slidable within bushings provided on the frame.

The slide rod 102 is connected by a pivoting link 120 to a cam lever 121 which is pivoted at 122 and carries a cam roller 123. The spring 124 biases the lever 121 downwardly to hold roller 123 in contact with cam 104 in spite of the overhung weight of the transfer arm which tends to lift the lever 121.

Similar parts may be provided to drive the slide rod 102A from cam 104A, although it is also possible to drive both of these slide rods from a single cam.

In view of the fact that the transfer arms are oppositely operated, the vacuum system in one pick-up head is open during a pick-up operation while the vacuum system in the other pick-up head is closed during a delivery operation. For this reason, separate vacuum cams, valves and lines are provided for the two transfer arms.

It will be understood that the contours of cams 99, 104 and 104A will be of such shape as to control the movements of the crosshead 94 and the transfer arms 10a so as to pick up and deposit ware in the manner previously described.

Conclusion

It will be clear to those skilled in the art that the device of the present invention provides a compact and efficient mechanism for the transfer of dinnerware during its manufacture. It is especially useful in those situations where it is desired to transfer the dinnerware automatically without inverting it.

It should also be understood that certain features of the invention may be used in other combinations than those illustrated, as provided for in the appended claims.

In the arrangement of both Figs. 2 and 9 the semi-planetary motion of the transfer arm brings the transfer head to a preliminary position directly over the handling station, but spaced above the center of the handling station and with its axis vertical. The plunger carrying the pick-up device is thereupon moved downwardly along its vertical axis until the pick-up device reaches the handling position, i.e., either in contact with the piece of ware to be picked up, or until the piece of ware being delivered is in contact with the support or stack of ware onto which it is to be delivered.

After the ware has been handled (either picked up or delivered) the pick-up device is moved upward on the same straight vertical line until it again reaches its preliminary position directly over the handling station.

This straight vertical movement of the pick-up device from and back to a preliminary position spaced above the handling station provides a substantial vertical lost-motion adjustment which has the following important advantages:

(1) It permits moving the pick-up device down into a bowl or other article having high sides.

(2) It permits moving ware to and from stacks which may change in height from relatively tall to very low, or vice versa.

These advantages are achieved without the necessity of making any adjustment in the transfer mechanism.

According to the provisions of the patent statutes, I have explained the principle of my invention, and have illustrated and described what I now consider to represent its best embodiment. However, I desire to have it understood that, within the scope of the appended claims, the invention may be practiced otherwise than as specifically illustrated and described.

I claim:

1. A transfer device for transferring articles from a pick-up station to a delivery station, comprising:

a stationary frame;

a horizontal shaft mounted on said frame;

a stud shaft supported on the horizontal shaft and rotatable about the axis of said horizontal shaft;

a stationary gear extending around and above said horizontal shaft;

a rotatable gear mounted on the stud shaft and engaging the stationary gear;

a transfer arm mounted on and rotatable with the rotatable gear and carrying a pick-up device;

means to cause the rotatable gear to move relative to the stationary gear to simultaneously rotate the transfer arm and swing the pick-up device from a pick-up station on one side of the horizontal shaft to a delivery station on the other side of the horizontal shaft;

and a reciprocable yoke mounted on the frame, said yoke being vertically reciprocable to move the pick-up device into contact with the article to be handled.

2. A device as specified in claim 1 in which the pick-up device after it reaches a handling station is spring-biased away from the article to be handled, and the reciprocable yoke is mounted on the frame independently of the pick-up device and is vertically reciprocable to move the pick-up device downwardly into contact with the article to be handled.

3. A device as specified in claim 2 in which a yoke is provided at both the pick-up and the delivery stations.

4. A device as specified in claim 2 in which the yoke has a pair of spaced-apart fingers which engage the pick-up device.

5. A transfer device for transferring articles from a pick-up station to a delivery station, comprising:

a frame, a horizontal shaft mounted on said frame and capable of oscillation about its own axis;

a stationary gear extending around and above said shaft;

a stud shaft keyed to the horizontal shaft and extending outwardly from the horizontal shaft;

a gear mounted rotatably on the stud shaft and in engagement with the stationary segmental gear;

a transfer arm mounted on and rotatable with the rotatable gear and carrying at its outer end a pick-up device;

means for oscillating said shaft to cause the rotatable gear to move relative to the stationary gear to simultaneously rotate the transfer arm and swing the pick-up device from a pick-up station on one side of the horizontal shaft to a delivery station on the other side of the horizontal shaft;

and a reciprocable yoke mounted on the frame, said yoke being vertically reciprocable to move the pick-up device into contact with the article to be handled;

whereby articles may be handled from stacks of varying height at the handling stations.

6. A device as specified in claim 5 in which the pick-up device after it reaches a handling station is spring biased away from the article to be handled, and the reciprocable yoke is mounted on the frame independently of the pick-up device and is vertically reciprocable to move the pick-up device downwardly into contact with the article to be handled.

7. A device as specified in claim 6 in which a yoke is provided at both the pick-up and the delivery stations.

8. A device as specified in claim 6 in which the yoke has a pair of spaced-apart fingers which engage the pick-up device.

9. A transfer device for transferring articles from a pick-up station to a delivery station, comprising:

a transfer arm mounted so that its outer end is movable from a pick-up station to a delivery station;

means for so moving the transfer arm;

a transfer head mounted on the outer end of the transfer arm;

the transfer head having an outer support tube which is arranged to arrive in a vertical position above the article at both pick-up and delivery stations;

a plunger reciprocably mounted in the support tube and spring-biased to an inner position;

a suction cup mounted on the lower end of the plunger and adapted to engage the upper surface of the article;

means to create a vacuum within the suction cup to pick up the article;

a yoke mounted on the machine, the parts being so constructed and arranged that when the suction cup arrives at an article-handling station the suction cup is located directly under the yoke;

and means to press the yoke downwardly against the suction cup to move the suction cup into contact with the article to be handled.

10. A transfer device for transferring articles from a pick-up station to a delivery station comprising:

a rotatable shaft mounted horizontally;

a transfer arm having one end operatively connected with the horizontal shaft and carrying at its free end a transfer head;

the transfer head having a support tube and a plunger reciprocably mounted in the support tube and carrying a pick-up device;

the plunger being so mounted and carried by the support tube that the pick-up device can after it arrives at an article-handling station be reciprocated relative to the support tube to accommodate its position to varying heights of a stack relative to which the article is being handled;

means to move the transfer head from one article-handling station to another;

the parts being so constructed and arranged that at each article-handling station the transfer head arrives at a preliminary position in which the plunger is positioned with its longitudinal axis alined vertically with the center of the article-handling station and with the pick-up device spaced an appreciable distance above its article-handling position;

and means operable while the transfer head remains in the preliminary position to reciprocate the pick-up device along the axis of the plunger to handle an article.

11. A device as specified in claim 10 in which:

the plunger is freely slidable in the support tube and is biased downwardly by gravity;

the horizontal shaft is mounted on a crosshead which is vertically movable;

and means is provided to reciprocate the crosshead.

References Cited in the file of this patent

UNITED STATES PATENTS

| | | |
|---|---|---|
| 1,691,497 | Rowe | Nov. 13, 1928 |
| 2,334,174 | Clausen | Nov. 16, 1943 |
| 2,573,660 | Brownell | Oct. 30, 1951 |
| 2,809,769 | Clarke | Oct. 15, 1957 |
| 2,829,782 | Roeber | Apr. 8, 1958 |

FOREIGN PATENTS

| | | |
|---|---|---|
| 58,620 | Denmark | Apr. 21, 1941 |